United States Patent
Park et al.

(10) Patent No.: US 7,599,306 B2
(45) Date of Patent: Oct. 6, 2009

(54) MEDIA ACCESS CONTROLLER

(75) Inventors: Chan Won Park, Daejeon (KR); Dae Hwan Hwang, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 740 days.

(21) Appl. No.: 10/861,613

(22) Filed: Jun. 4, 2004

(65) Prior Publication Data

US 2005/0141544 A1 Jun. 30, 2005

(30) Foreign Application Priority Data

Dec. 26, 2003 (KR) .................... 10-2003-0097153

(51) Int. Cl.
*H04L 12/26* (2006.01)
(52) U.S. Cl. ..................................... 370/252
(58) Field of Classification Search ................. 370/448, 370/445, 229, 235, 236, 236.1, 252
See application file for complete search history.

(56) References Cited

U.S. PATENT DOCUMENTS

| | | | | |
|---|---|---|---|---|
| 5,963,560 | A * | 10/1999 | Kalkunte | 370/448 |
| 6,006,271 | A * | 12/1999 | Grabiec et al. | 709/235 |
| 6,256,317 | B1 | 7/2001 | Holloway et al. | |
| 6,574,237 | B1 * | 6/2003 | Bullman et al. | 370/465 |
| 6,665,752 | B1 * | 12/2003 | Bernath et al. | 710/52 |
| 7,440,443 | B2 * | 10/2008 | Logvinov et al. | 370/352 |
| 2002/0163933 | A1 * | 11/2002 | Benveniste | 370/465 |

FOREIGN PATENT DOCUMENTS

KR 2003-0046116 6/2003
KR 2003-0072933 9/2003

OTHER PUBLICATIONS

"Design and Analysis of a Distribution MAC Protocol for a Real Time Integrated Service of an IEEE 802.11-Based Ad Hoc Wireless LAN" by Kim, Won-Soo, et al.; *Korean Institute of Communication and Sciences*, 2003; vol. 28, No. 11B, pp. 985-998.

* cited by examiner

*Primary Examiner*—Seema S Rao
*Assistant Examiner*—Mon Cheri S Davenport
(74) *Attorney, Agent, or Firm*—Blakely, Sokoloff, Taylor & Zafman LLP

(57) ABSTRACT

The present invention relates to a media access controller, and more particularly, to a media access controller which can adjust operational parameters according to a setting environment of a packet transmission system by re-setting the operational parameters of the media access controller by an external source. A media access controller (MAC) according to an aspect of the present invention comprises: a carrier analyzer, which generates a timeslot using a carrier sense signal input from a modem of a station and outputs a type and a timeslot of a received frame; a collision resolution handler, which grants medium access by monitoring for collisions between stations and between itself and another station using a collision resolution algorithm; a random number generator, which generates a random number (RndNum) based on a MAC address value when a collision between itself and another station occurs; a transmission on generator, which receives a transmission ready (TxReady) signal and a timeslot to be transmitted from a frame controller of the system and generates a data transmission on (TxDataOn) signal and a transmission frame type (TxSigType) signal; and a parameter setting unit, which adjusts operational parameters of the MAC to be suitable for a setting environment of the station.

4 Claims, 20 Drawing Sheets

FIG. 5B

| Port name | I/O | Description | external from/to |
|---|---|---|---|
| CLK | I | Input clock | Clock generator |
| Rest | I | Reset(active high) | Reset Controller |
| TxReady | I | Transmit ready on(active high) | Frame Controller |
| TxDataOn | O | Transmit enable(active high) | Frame Controller |
| TxSigType | O | Transmit frame type<br>0 : valid frame<br>1 : signal frame | Frame Controller |
| Col | I | Collision(active high) | Frame Controller |
| TimeOut | O | active high when collision occurs 256 times | Frame Controller |
| CS | I | Carrier sense(active high) | De-modulator |
| Tx_PRI[2:0] | I | Transmit packet priority value | Manager |
| SA | I | Source Address | Manager |
| RxSigType | I | Received packet type<br>00 : Unknown<br>01 : Valid frame<br>10 : Collision fragment<br>11 : Signal frame | Manager |
| Parameters | | 도6o 참조 | Manager |

FIG. 6B

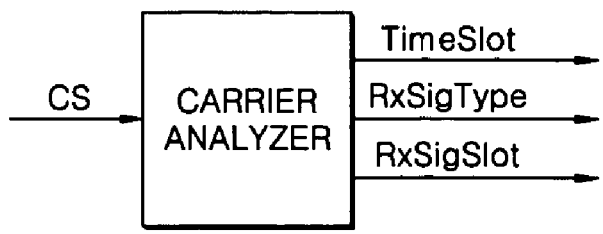

FIG. 6C

| Port name | I/O | Description | From/To |
|---|---|---|---|
| CS | I | Carrier sense(active high) | MODEM |
| TimeSlot[5:0] | O | Time slot<br>000000: Unknown<br>000100: FG<br>000101: IFG<br>001000: BS0<br>001001: BS1<br>001010: BS2<br>001011: BS3<br>001100: BS4<br>001101: BS5<br>001110: BS6<br>001111: BS7<br>010000: PRI0<br>010001: PRI1<br>010010: PRI2<br>010011: PRI3<br>010100: PRI4<br>010101: PRI5<br>010110: PRI6<br>010111: PRI7<br>100000: Unsync | COLLISION RESOLUTION HANDLER TRANSMISSION ON GENERATOR |
| RxSigType | O | The type of received packet<br>00 : Unknown<br>01 : Valid frame<br>10 : Collision fragment<br>11 : Signal frame | COLLISION RESOLUTION HANDLER MANAGER |
| RxSigSlot[5:0] | O | The timeSlot of received packet, value is equal to TimeSlot | COLLISION RESOLUTION HANDLER MANAGER |

FIG. 6D
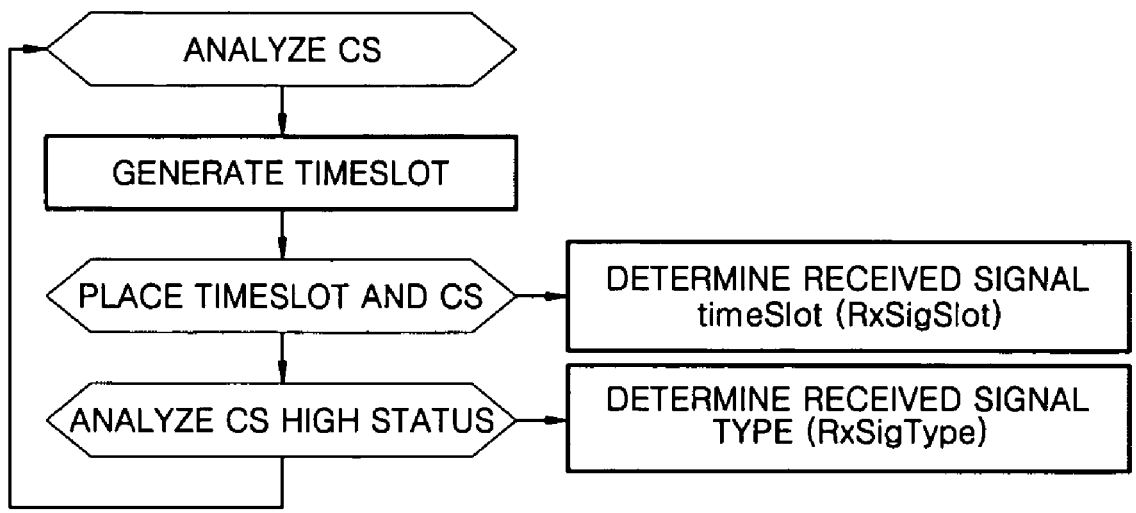
FIG. 6E
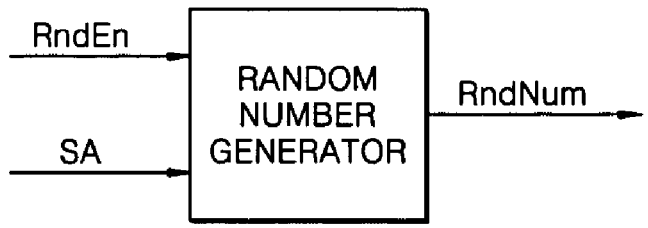
FIG. 6F
| Port name | I/O | Description | From/To |
|---|---|---|---|
| SA | I | Source Address | Manager |
| RndEn | I | Random number generator enable | TRANSMISSION ON GENERATOR |
| RndNum[nSIG:0] | O | Random number | COLLISION RESOLUTION HANDLER TRANSMISSION ON GENERATOR |

FIG. 6I

| Port name | I/O | Description | From/To |
|---|---|---|---|
| TxReady | I | Transmit ready on(active high) | Frame Controller |
| Tx_PRI[2:0] | I | Transmit packet priority value | Manager |
| CS | I | Carrier sense(active high) | Modem |
| TimeSlot[5:0] | I | Time slot<br>000000: Unknown<br>000100: FG<br>000101: IFG<br>001000: BS0<br>001001: BS1<br>001010: BS2<br>001011: BS3<br>001100: BS4<br>001101: BS5<br>001110: BS6<br>001111: BS7<br>010000: PRI0<br>010001: PRI1<br>010010: PRI2<br>010011: PRI3<br>010100: PRI4<br>010101: PRI5<br>010110: PRI6<br>010111: PRI7<br>100000: Unsync | CARRIER ANALYZER |
| RxSigType | I | The type of received packet<br>00 : Unknown<br>01 : Valid frame<br>10 : Collision fragment<br>11 : Signal frame | CARRIER ANALYZER |
| RxSigSlot[5:0] | I | The timeSlot of received packet, value is equal to TimeSlot | CARRIER ANALYZER |
| RndNum[nSIG:0] | O | Transmit packet priority value | RANDOM NUMBER GENERATOR |
| BL[bitBL:0] | O | Carrier sense(active high) | TRANSMISSION ON GENERATOR |

FIG. 6L

| Port name | I/O | Description | From/To |
|---|---|---|---|
| TxReady | I | Transmit ready on(active high) | Frame Controller |
| Tx_PRI[2:0] | I | Transmit packet priority value | Manager |
| CS | I | Carrier sense(active high) | Modem |
| BL[bitBL:0] | I | Back-Off level value equal to Tx_PRI | COLLISION RESOLUTION HANDLER |
| TimeSlot[5:0] | I | Time slot<br>000000: Unknown<br>000100: FG<br>000101: IFG<br>001000: BS0<br>001001: BS1<br>001010: BS2<br>001011: BS3<br>001100: BS4<br>001101: BS5<br>001110: BS6<br>001111: BS7<br>010000: PRI0<br>010001: PRI1<br>010010: PRI2<br>010011: PRI3<br>010100: PRI4<br>010101: PRI5<br>010110: PRI6<br>010111: PRI7<br>100000: Unsync | CARRIER ANALYZER |
| Col | I | Collision(ative high) | Frame Controller |
| RndNum[nSIG:0] | I | Random number | RANDOM NUMBER GENERATOR |
| TxDataOn | O | Transmit enable(active high) | Frame Controller |
| TxDataOn | O | Transmit frame type<br>0 : valid frame<br>1 : signal frame | Frame Controller |
| TimeOut | O | active high when collision occurs 256 times | RANDOM NUMBER GENERATOR |
| RndEn | O | Random number generator enable | Frame Controller |

FIG. 60

| Port name | I/O | Description | From/To | Applied Function Block |
|---|---|---|---|---|
| SetEn[10:0] | I | parameter setting enable, auto clearable.<br>setEn[0] : tFG enable<br>setEn[1] : tIFG enable<br>setEn[2] : tSIG enable<br>setEn[3] : tPRI enable<br>setEn[4] : nSIG enable<br>setEn[5] : bitMBL enable<br>setEn[6] : bitBL enable<br>setEn[7] : minFrameSize enable<br>setEn[8] : maxFrameSize enable<br>setEn[9] : tVFrame enable<br>setEn[10] : CD_min enable | all '0' | |
| tFG | I | The time length of Fragment Gap include collision frame time (0~100 us) | 92 us | CARRIER ANALYZER |
| tIFG | I | The time length of Inter-Frame Gap (0~128 us) | 29 us | CARRIER ANALYZER |
| tSIG | I | The time length of one Back-off (0~50 us) | 32 us | CARRIER ANALYZER |
| tPRI | I | The time length of one Priority Slot (0~128 us) | 21 us | CARRIER ANALYZER |
| nSIG | I | The number of Back-off (0~7) | 3 | CARRIER ANALYZER RANDOM NUMBER GENERATOR |
| bitMBL | I | The number of Maximum Back-of Level bit (0~7) | 4 | CARRIER ANALYZER COLLISION RESOLUTION HANDLER |
| bitBL | I | The number of Back-off Level bit (0~7) | 4 | CARRIER ANALYZER COLLISION RESOLUTION HANDLER |
| minFrameSize | I | Minimum frame size (0~128) | integer 64 | CARRIER ANALYZER |
| maxFrameSize | I | Maximum frame size (0~4096) | integer 1526 | CARRIER ANALYZER |
| tVFrame | I | The time length of minimum valid frame (0~185) | 92.5 us | CARRIER ANALYZER |
| CD_min | I | The time length of minimum collision fragment (0~70) | 32 us | CARRIER ANALYZER |

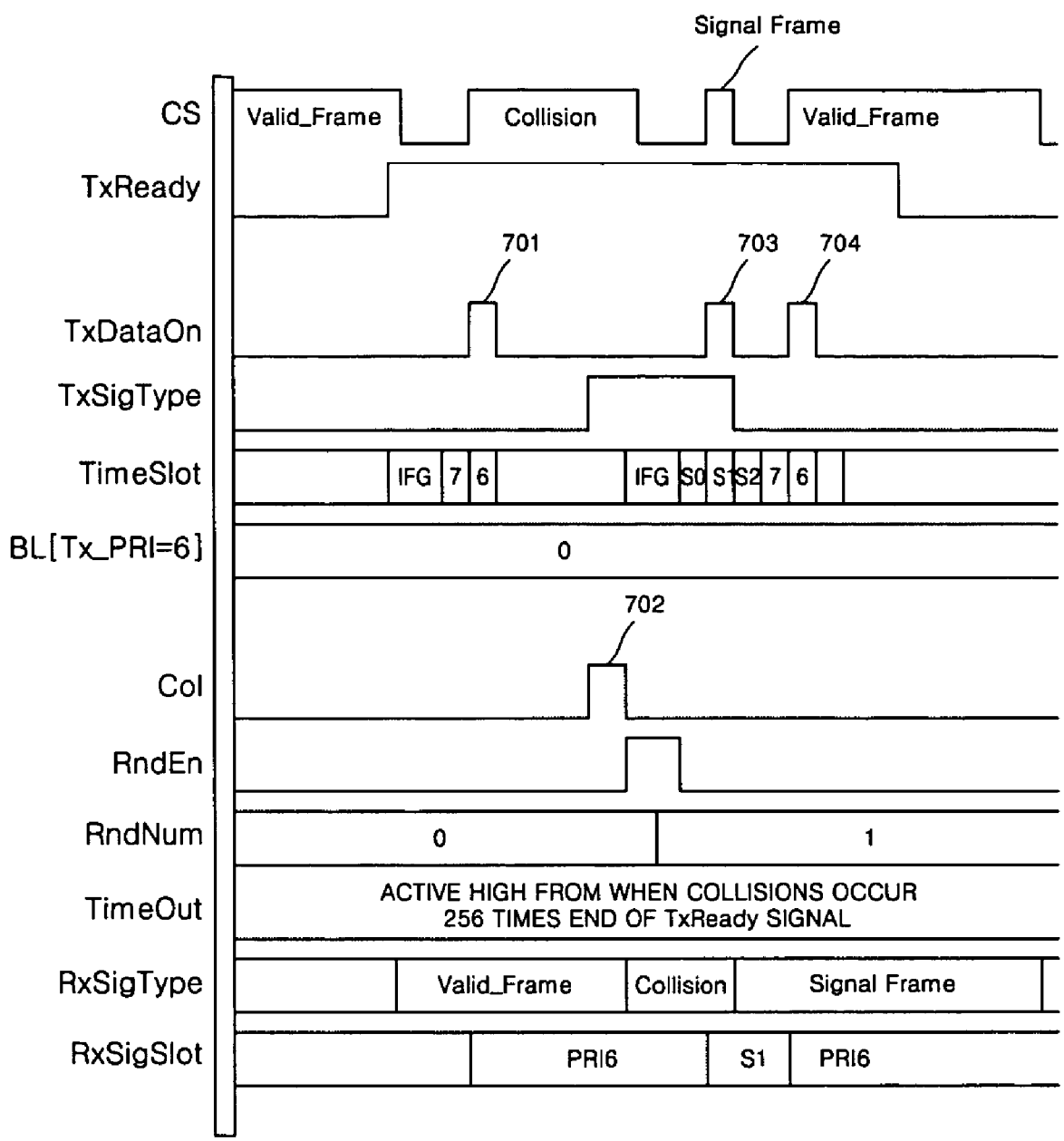

MEDIA ACCESS CONTROLLER

This application claims the priority of Korean Patent Application No. 2003-97153, filed on Dec. 26, 2003, in the Korean Intellectual Property Office, the disclosure of which is incorporated herein in its entirety by reference.

BACKGROUND OF THE INVENTION

1. Field of the Invention

The present invention relates to a media access controller, and more particularly, to a media access controller, which can adjust operation parameters according to a setting environment of a packet transmission system by re-setting the operational parameters of the media access controller externally.

2. Description of the Related Art

FIG. 1 illustrates a conventional embodiment in which a plurality of packet transmission stations are connected to a shared medium. When a plurality of packet transmission stations use a shared medium, a media access control (MAC) protocol is used to facilitate communication and prevent collisions among the stations.

A CSMA/CD algorithm is widely used as a MAC protocol of IEEE 802.3 in wired local area networks and a CSMA/CA algorithm is widely used as a MAC protocol of IEEE 802.11 in wireless local area networks. In a representative home network standard, i.e., a 10 Mbps home phone-line networking alliance (HomePNA) standard, the CSMA/CD algorithm augmented by a priority control algorithm and a distributed fair priority queuing (DFPQ) collision resolution algorithm is widely used.

FIG. 2 is a block diagram of a conventional packet transmission system. Most packet transmission stations are often called a packet transceiver and correspond to the stations illustrated in FIG. 1. The packet transmission system has frame generation, scrambling, and modulation functions for sending packets, and demodulation, descrambling, and deframing functions for receiving packets.

Also, since the packet transmission system shares a medium as illustrated in FIG. 1, the packet transmission system includes a MAC 21, a collision detector 22, which informs the MAC 21 if a collision occurs, a carrier sensor 23, which generates a carrier sense signal, and a manager 24, which monitors the whole system, sets specific registers to predetermined values, and reads the specific registers.

FIG. 3 illustrates an example of a multiple media access control having a transmission priority. When transmission priorities of stations are not determined, a collision rate is very high, and since there is no solution involving prioritization of data, quality of service (QoS) is very low. In FIG. 3, a highest priority is priority 7 and a lowest priority is priority 0. Since a priority of 6 [Tx_PRI=6] is assigned to a station 1 (STA1), data of the STA1 is transmitted first, data of a station 2 (STA2) having a priority of 5 [TX_PRI=5] is transmitted next, and then data of a station 3 (STA3) having a priority of 3 [TX_PRI=3] is transmitted last.

FIGS. 4a through 4c illustrate timeslots of a HomePNA. A 1 Mbps HomePNA standard version 1.0 was announced in September 1998, a 10 Mbps HomePNA standard version 2.0 was announced in December 1999, a 10 Mbps HomePNA standard version 2.1 was announced in August 2001, and a 100 Mbps HomePNA standard version 3.0 was announced in August 2003.

FIG. 4a is a timeslot of a case where there are no collisions among stations, the timeslot defined in the HomePNA standard versions 2.0/2.1. FIG. 4b is a timeslot after a collision among stations, the timeslot defined in the HomePNA standard version 2.0. FIG. 4c is a timeslot after a collision among stations, the timeslot defined in the HomePNA standard version 2.1. In FIG. 4b, an inter-frame gap (IFG) comes just after a collision frame, but in FIG. 4c, the IFG comes after 92 μs, which includes the collision frame.

A timeslot is a transmission time unit used in a media access controller (MAC) as illustrated in FIGS. 4a through 4c. A sending station sends data at an appropriate timeslot using the timeslot. Also, the timeslot is used for identifying which timeslot an input frame uses. When applied standards are changed as illustrated in FIGS. 4b and 4c, compatibility between a design to which a prior standard is applied and a design to which an updated standard is applied must be considered. Also, since HomePNA standards define the maximum number of stations capable of concurrently connecting to a shared medium as 25 but the number of bits of a back-off counter used for resolving collisions as 4, the maximum number of simultaneously colliding stations is limited to 15.

However, due to increasing popularity of home networks and improvements in physical layer products, the maximum number of stations and bits of a back-off counter will likely increase. Therefore, there is need for a new apparatus capable of ensuring QoS now and in the future and of dealing with standard changes.

SUMMARY OF THE INVENTION

The present invention provides a media access controller, which improves quality of service (QoS) by dealing with frames having transmission priorities, performing a collision resolution algorithm, bounding a latency time after a collision by a predetermined time, receiving operation parameters externally, and adjusting the parameters to be suitable for a setting environment.

According to an aspect of the present invention, there is provided a media access controller (MAC) comprising: a carrier analyzer, which generates a timeslot using a carrier sense signal input from a modem of a station and outputs a type and a timeslot of a received frame; a collision resolution handler, which grants medium access by monitoring for collisions between stations and between itself and another station using a collision resolution algorithm; a random number generator, which generates a random number based on a MAC address value when a collision between itself and another station occurs; a transmission on generator, which receives a transmission ready signal and a timeslot to be transmitted from a frame controller of the system and generates a data transmission on signal and a transmission frame type signal; and a parameter setting unit, which adjusts operation parameters of the MAC to be suitable for a setting environment of the station.

BRIEF DESCRIPTION OF THE DRAWINGS

The above and other features and advantages of the present invention will become more apparent by describing in detail exemplary embodiments thereof with reference to the attached drawings in which:

FIG. 5b is a table listing the interface signals between the MAC and the peripheral devices of FIG. 5a;

FIG. 6b illustrates interface signals of a carrier analyzer of FIG. 6a;

FIG. 6c is a table listing interface signals of the carrier analyzer;

FIG. 6d is a flowchart illustrating operation of the carrier analyzer;

FIG. 6e illustrates interface signals of a random number generator of FIG. 6a;

FIG. 6f is a table listing interface signals of the random number generator;

FIG. 6h illustrates interface signals of a collision resolution handler of FIG. 6a;

FIG. 6i is a table listing interface signals of the collision resolution handler;

FIG. 6k illustrates interface signals of a transmission on generator of FIG. 6a;

FIG. 6l is a table listing interface signals of the transmission on generator;

FIG. 6n illustrates interface signals of a parameter setting unit of FIG. 6a;

FIG. 6o is a table listing interface signals of the parameter setting unit;

FIG. 7 is a timing diagram of the MAC.

DETAILED DESCRIPTION OF THE INVENTION

Media access controllers (MACs) having a priority, which can set parameters, receive parameters externally and change the parameters to be suitable for a setting environment of a station, so that different standards are compatible. Thus, the applications of MACs can be expanded. Also, MACs deal with frames having transmission priorities, perform a DFPQ collision resolution algorithm, bound a latency time after a collision by a predetermined time, and send data in the predetermined time. Accordingly, the QoS of MACs can be improved.

The present invention will now be described more fully with reference to the accompanying drawings, in which an exemplary embodiment of the invention is shown. Like reference numbers are used to refer to like elements throughout the drawings.

Figure 5A:
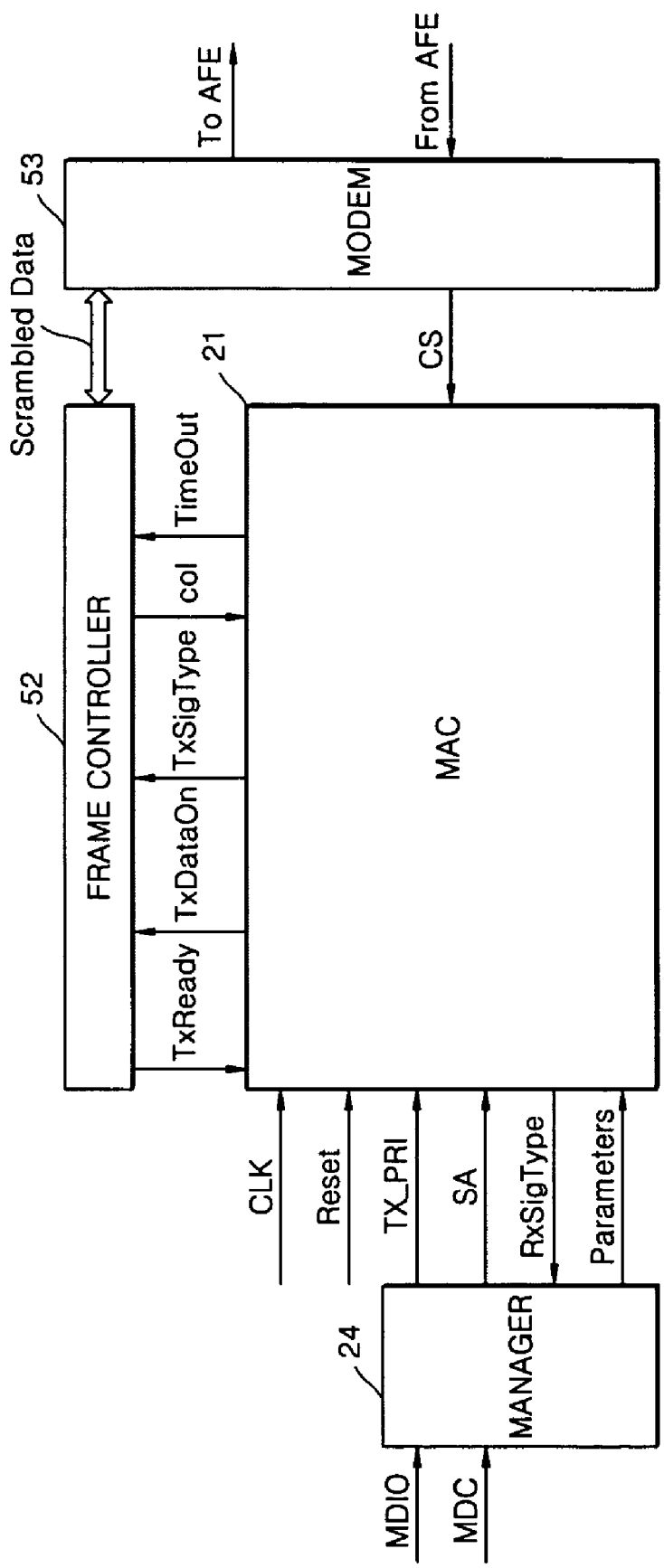
FIG. 5a is a signal diagram of interface signals between a media access controller (MAC) according to an exemplary embodiment of the present invention and peripheral devices.

FIG. 5a is a signal diagram of interface signals between a media access controller (MAC) according to an exemplary embodiment of the present invention and peripheral devices.

A packet transmission system generally called a packet transceiver includes a MAC 21, a frame controller 52 which performs buffering of data being transmitted/received, framing/deframing of the data, and scrambling/descrambling of the data, a modem 53 which modulates/demodulates a frame to be suitable for a medium, and a manager 24 which monitors the whole system, sets values of specific registers, and reads the values of specific registers using management data input/output (MDIO) and management data clock (MDC) serial data communication.

FIG. 5b is a table listing the interface signals between the MAC and the peripheral devices of FIG. 5a.

As shown in FIG. 5a, when the frame controller 52 tries to transmit a frame, it outputs a transmission ready (TxReady) signal to the MAC 21. The MAC 21 is always analyzing the status of a medium by receiving a carrier sense (CS) signal from the modem 53. If the MAC 21 sends an activated data transmission on (TxDataOn) signal to the frame controller 52 at a time when there is no possibility of a collision, the frame controller 52 starts to transmit the frame to the medium. The other signals illustrated in FIG. 5b will be described later when the internal configuration of the MAC 21 is described.

Figure 6A:
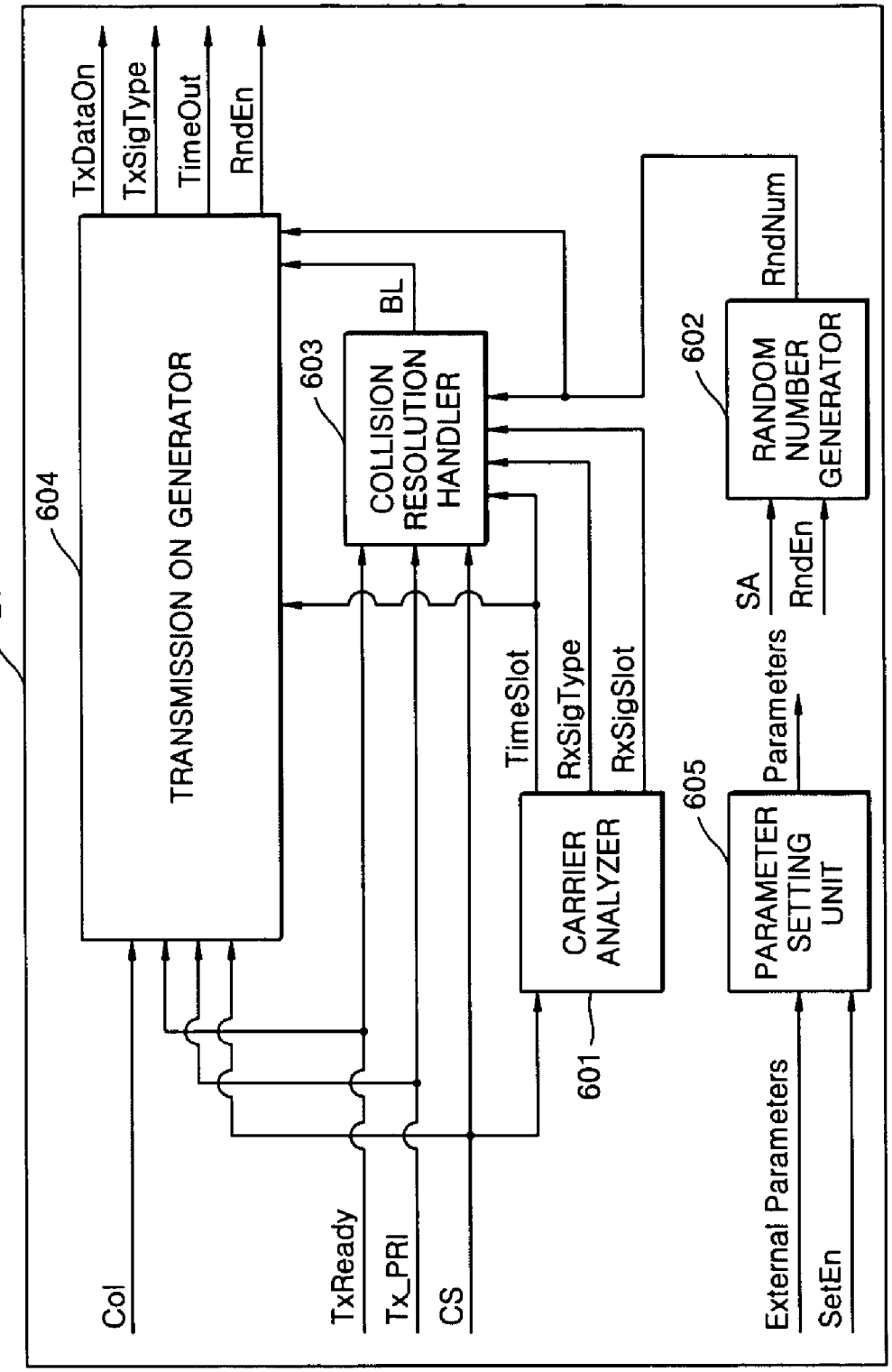
FIG. 6a is a block diagram illustrating an internal configuration of the MAC of FIG. 5a and interface signals of each component.

FIG. 6a is a block diagram illustrating the internal configuration of the MAC of FIG. 5a and interface signals of each component.

A carrier analyzer 601 receives and analyzes the CS signal and generates a timeslot (TimeSlot) and a received packet type (RxSigType).

A random number generator 602 receives a MAC address (source address: SA) of a transmission station itself and generates a random number using a linear feedback shift register (LFSR) circuit. When stations transmit during the same timeslot, a collision occurs. If a collision occurs, a time when a collided frame is retransmitted is determined using a back-off algorithm. At this time, one signal slot is selected and the back-off algorithm is performed using the MAC address uniquely assigned to each station. A random number is generated for selecting the signal slot.

A collision resolution handler 603 calculates a maximum back-off level (MBL) value and a back-off level (BL) value using the DFPQ algorithm for every priority slot. When the collision resolution handler 603 receives the TxReady signal from the frame controller 52, the collision resolution handler 603 outputs a BL value that is the same as a transmission packet priority (Tx_PRI) value until the transmission is finished. A back-off algorithm is a collision resolution algorithm included in most MACs. Whenever a collision occurs, a collided frame must be retransmitted. The time when the collided frame is retransmitted is determined using the back-off algorithm.

If the TxReady signal is received from the frame controller 52, a transmission on generator 604 outputs a transmission frame type (TxSigType) signal and a TxDataOn signal at a transmission data priority slot or an arbitrary slot with reference to the BL value that is the same as the Tx_PRI value. If a collision occurrence signal (Col) is received from the frame controller 52, the transmission on generator 604 outputs the TxSigType signal and the TxDataOn signal at a back-off signal slot having a random number value (RndNum).

A parameter setting unit 605 adjusts operational parameters of the MAC 21, such as an internal clock length and the number of counters, to be suitable for a setting environment of the station. The setting environment means a set standard, such as a HomePNA.

Detailed operations of function blocks illustrated in FIG. 6a will now be described with reference to FIGS. 6b through 6q.

FIG. 6b illustrates interface signals of the carrier analyzer 601 of FIG. 6a. FIG. 6c is a table listing interface signals of the carrier analyzer 601. FIG. 6d is a flowchart illustrating operation of the carrier analyzer 601.

Referring to FIGS. 5a and 6b, the carrier analyzer 601 receives the CS signal from the modem 53 and outputs a TimeSlot signal, an RxSigType signal, and a received packet timeslot (RxSigSlot) signal.

The TimeSlot signal generated by the carrier analyzer 601 includes a fragment gap (FG) slot signal, an inter-frame gap (IFG) slot signal, 8 back-off slot BS0-BS7 signals, 8 priority slot PRI0-PRI7 signals, and an unsync slot signal, which is an always transmittable division, as shown in FIG. 6c. A time length of each slot can be re-set by the parameter setting unit 605 and is set to 0 when the slot is not used.

As shown in FIG. 6d, the carrier analyzer 601 receives the CS signal from the modem 53, analyzes the CS signal, and generates the TimeSlot signal, the RxSigSlot signal, and the RxSigType. Positions of the TimeSlot signal and the CS signal are determined by the RxSigSlot signal. Whether a received packet is a valid frame, a collision fragment, or a signal frame used for the back-off is determined by the RxSigType.

Figure 6G:
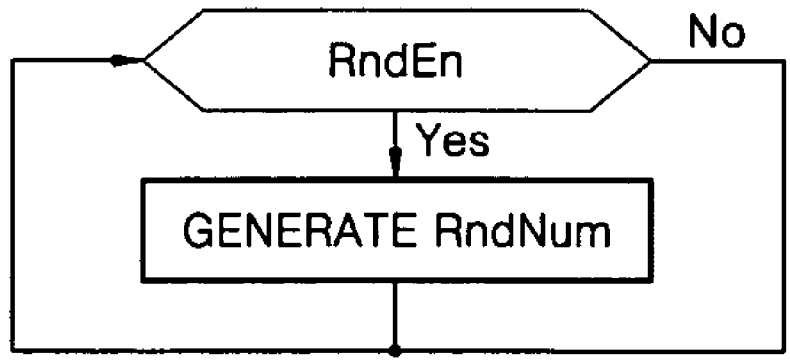
FIG. 6g is a flowchart illustrating operation of the random number generator.

FIG. 6e illustrates interface signals of the random number generator 602 of FIG. 6a. FIG. 6f is a table listing interface signals of the random number generator 602. FIG. 6g is a flowchart illustrating operation of the random number generator 602.

The random number generator 602 receives the MAC address (SA) of a station itself from the manager 24. The SA is used as an initial value of a linear feedback shift register (LFSR) circuit, which has a generating polynomial $G(x)=x^{47}+x^5+1$. If a collision occurs, the random number generator 602 receives a random number generator enable (RndEn) signal from the transmission on generator 604, operates the LFSR circuit, and outputs one value of given back-off slots, i.e., a RndNum value.

Figure 6H:
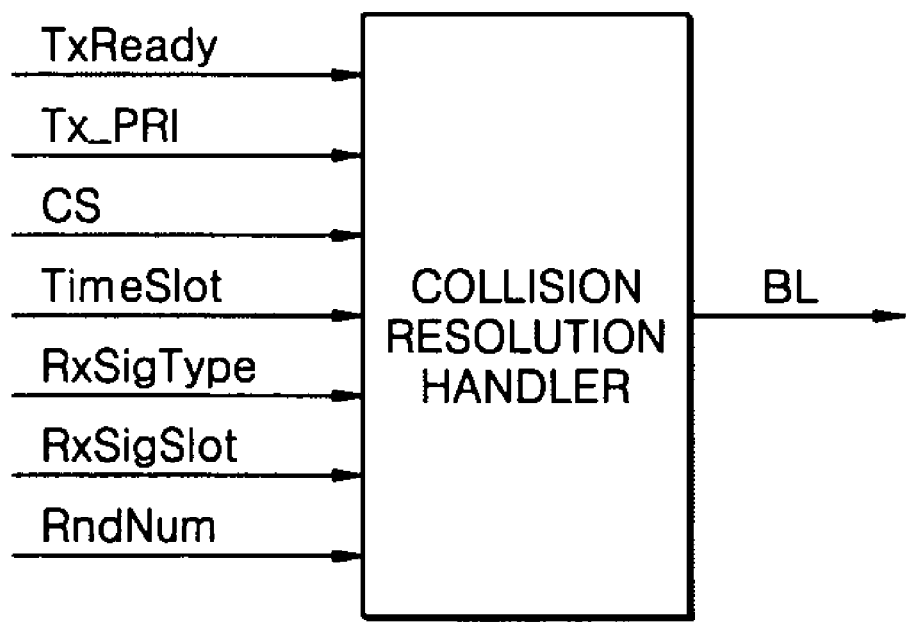
Figure 6J:
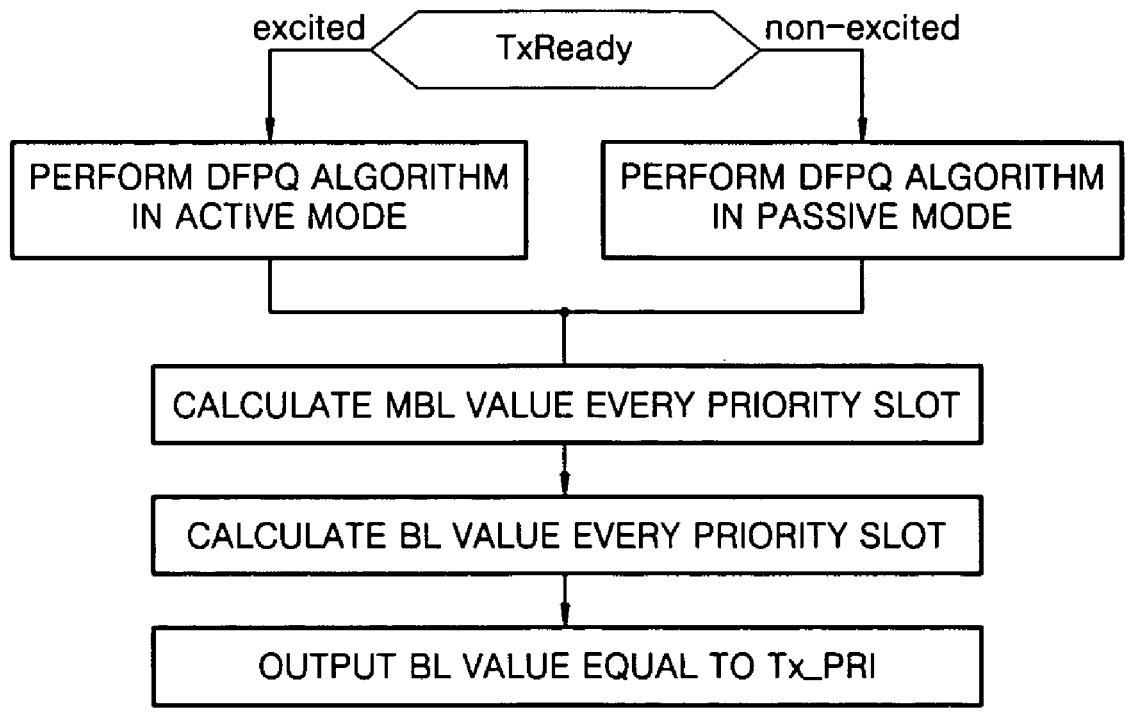
FIG. 6j is a flowchart illustrating operation of the collision resolution handler.

FIG. 6h illustrates interface signals of the collision resolution handler 603 of FIG. 6a. FIG. 6i is a table listing interface signals of the collision resolution handler 603. FIG. 6j is a flowchart illustrating operation of the collision resolution handler 603.

The collision resolution handler 603 handles a collision problem using a distributed fair priority queuing (DFPQ) algorithm used in a HomePNA standard version 2.0. As shown in FIG. 6j, the DFPQ algorithm used in the collision resolution handler 603 operates in a passive mode when the TxReady signal is non-excited. The DFPQ algorithm determines whether a collision occurs in the medium or whether normal transmitting/receiving is performed by monitoring the status of the medium. If a collision occurs, the DFPQ algorithm enables a station involved in the collision to transmit/receive first.

When the TxReady signal is excited, the DFPQ algorithm used in the collision resolution handler 603 operates in an active mode. At this time, the DFPQ algorithm seeks a time when the station itself can transmit.

The MBL register and the BL register are used for the DFPQ algorithm. Since the MBL and BL registers are placed every priority slot, each of the priority slots has a BL calculated value. The BL calculated value is calculated by comparing the BL slot selected by the input RndNum and a BL slot received from another terminal. The MBL register shows the total number of stations waiting to transmit after a collision, and the BL shows the number of waiting stations when the station itself tries to transmit data. Each station can transmit data only when a value of the BL register corresponding to its own Tx_PRI slot is 0.

Figure 6K:
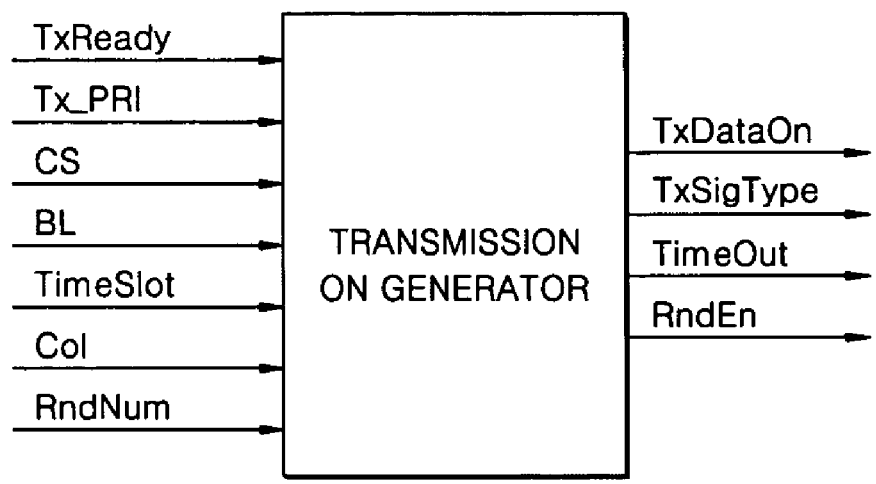
Figure 6M:
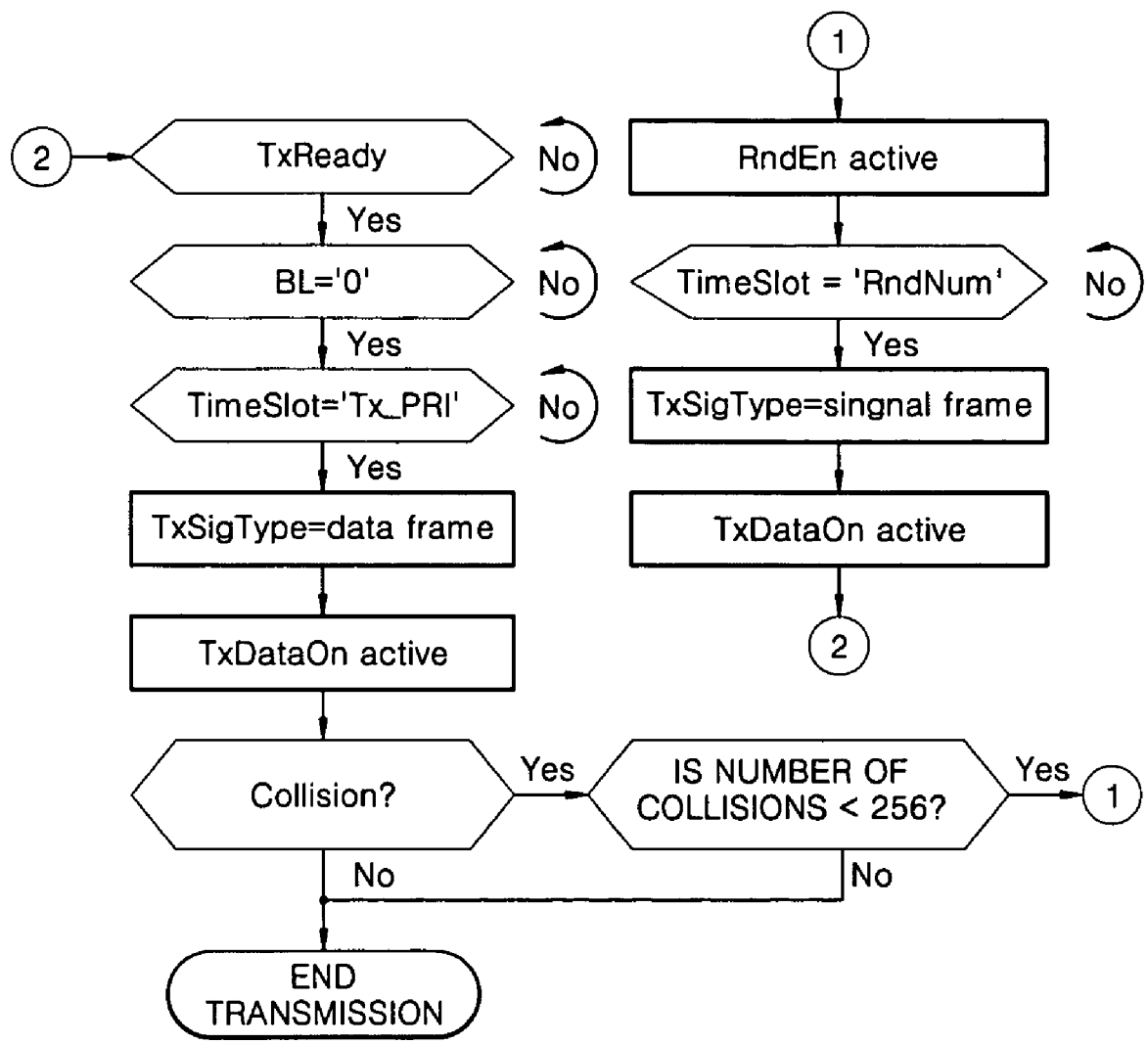
FIG. 6m is a flowchart illustrating operation of the transmission on generator.

FIG. 6k illustrates interface signals of the transmission on generator 604 of FIG. 6a. FIG. 6l is a table listing interface signals of the transmission on generator 604. FIG. 6m is a flowchart illustrating operation of the transmission on generator 604.

As shown in FIG. 6m, if the TxReady signal is activated, the transmission on generator 604 determines whether the value of the BL register which is equal to the station's own Tx_PRI is 0. If the value of the BL register is 0, the TxDataOn signal and the TxSigType signal are activated according to signal definitions shown in FIG. 6l and output from a priority slot (one slot among PRI0 through PRI7) matching the Tx_PRI.

If a collision occurs (the Col signal is in a logic high state), the transmission on generator 604 outputs the RndEn signal to the random number generator 602 causing the random number generator 602 to generate the RndNum. The transmission on generator 604 activates the TxDataOn signal and the TxSigType signal according to signal definitions shown in FIG. 6l so that a signal frame (3 slots used for the back-off algorithm) is transmitted from a back-off slot (one slot among BS0 through BS7) matching the RndNum.

A timeout (TimeOut) signal is activated when the number of collisions is 256. If the number of collisions is 256, the TimeOut signal is transmitted to the frame controller 52 and blocks the station from transmitting/receiving a frame.

Figure 6N:
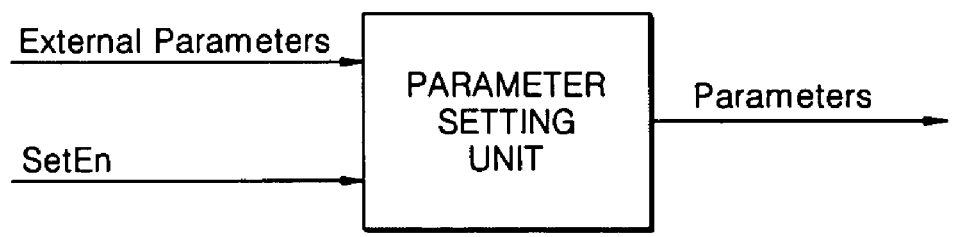
Figure 6P:
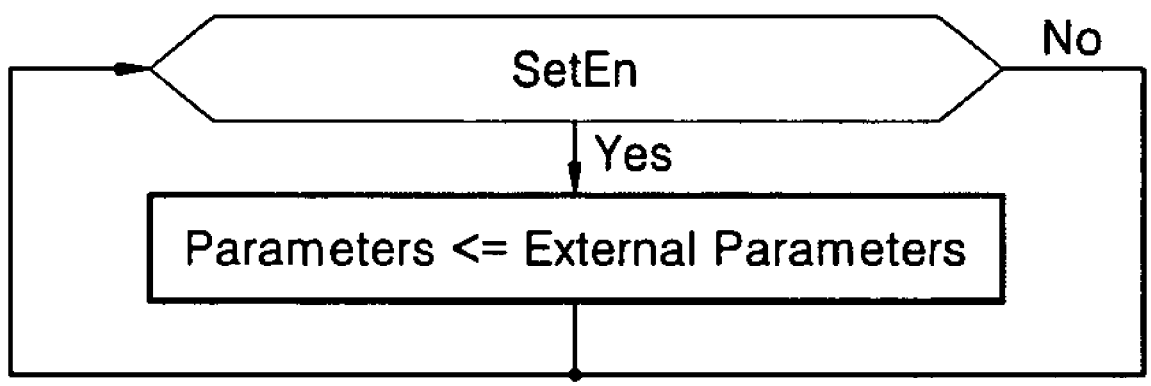
FIG. 6p is a flowchart illustrating operation of the parameter setting unit.

FIG. 6n illustrates interface signals of the parameter setting unit 605 of FIG. 6a. FIG. 6o is a table listing interface signals of the parameter setting unit 605. FIG. 6p is a flowchart illustrating operation of the parameter setting unit 605.

The parameter setting unit 605 adapts the MAC 21 to a setting environment. 11 re-settable operational parameters are shown in the left column of FIG. 6o.

A SetEn signal is an enable signal used when parameters are changed externally. The SetEn signal is activated in response to an external parameter setting change request (External Parameters).

Figure 1:
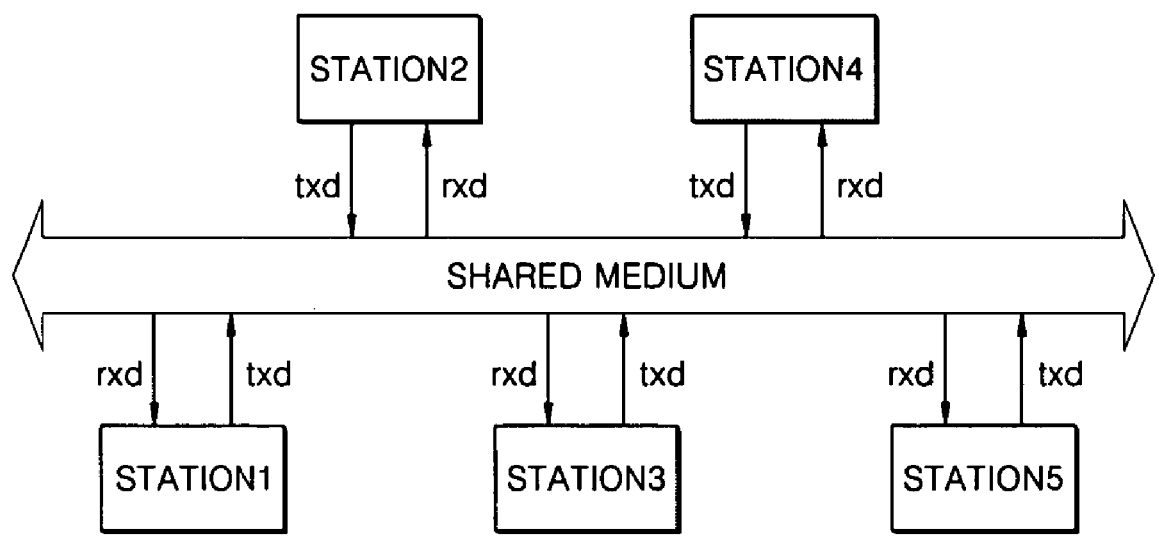
FIG. 1 illustrates a conventional embodiment in which a plurality of packet transmission stations are connected to a shared medium.
Figure 2:
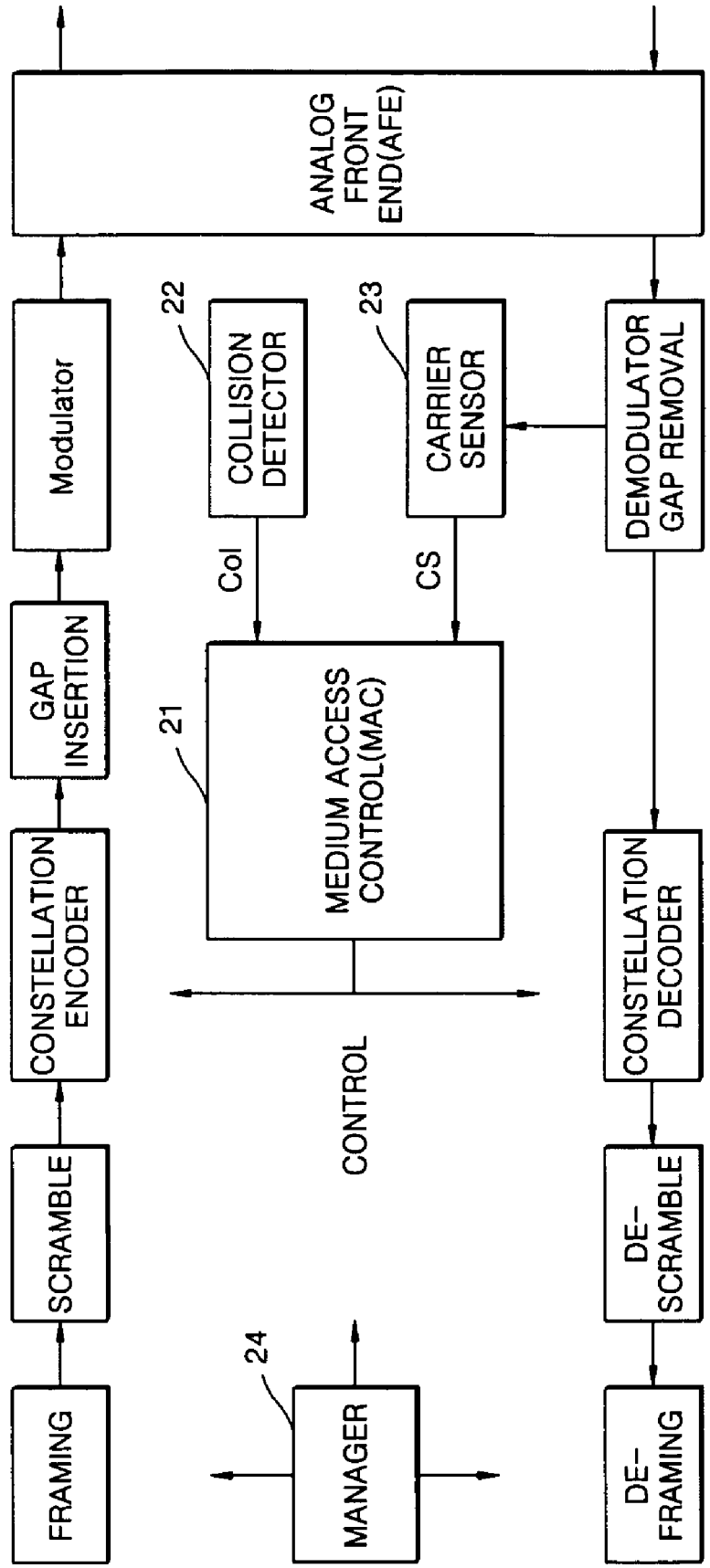
FIG. 2 is a block diagram of a conventional packet transmission system.
Figure 3:
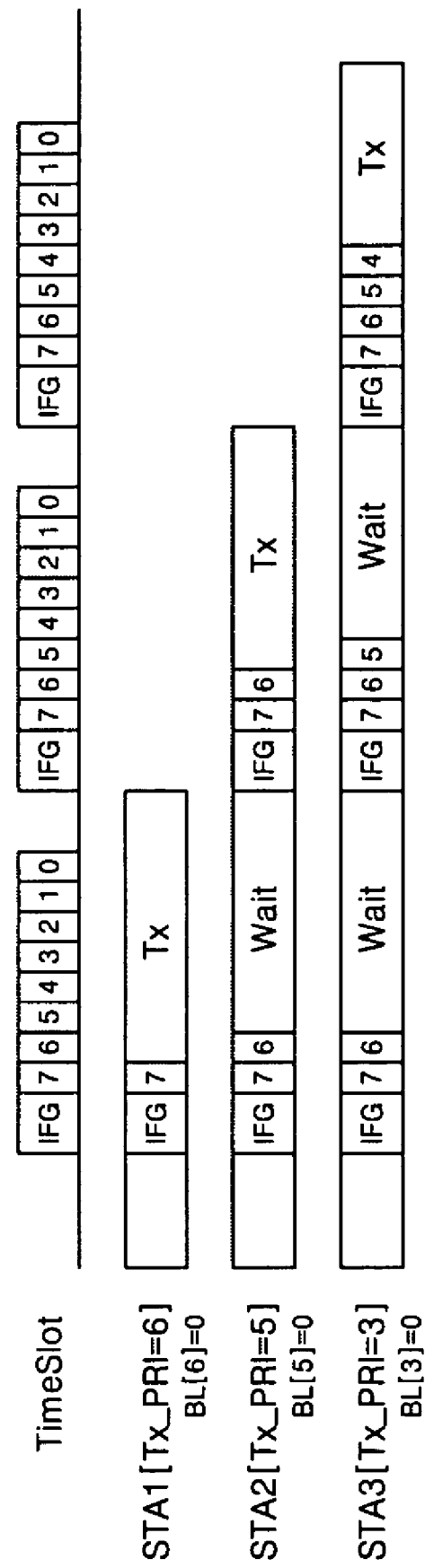
FIG. 3 illustrates an example of a multiple media access control having a transmission priority.
Figure 4A:
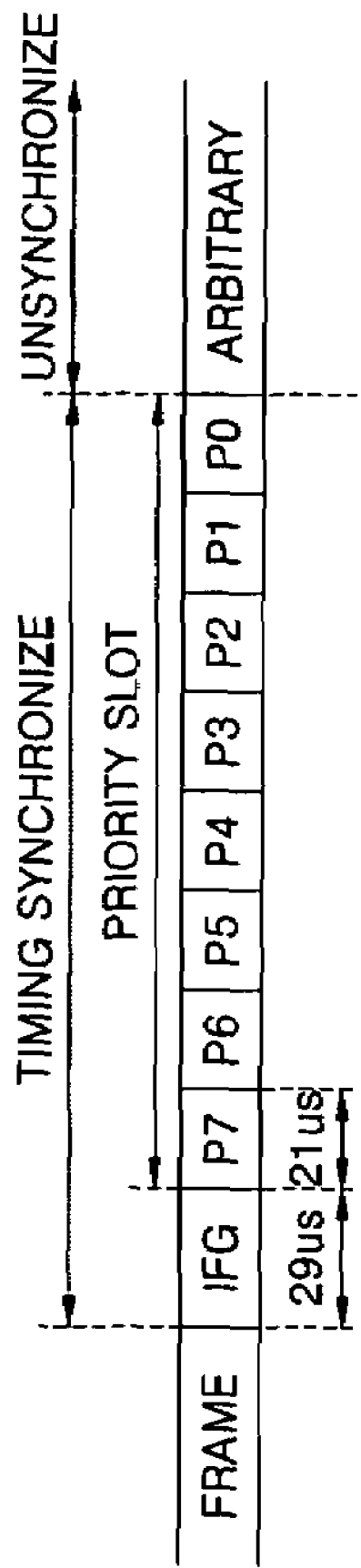
FIG. 4a is a timeslot of a case where there are collisions among stations, the timeslot defined in the HomePNA standard versions 2.0/2.1.
Figure 4B:
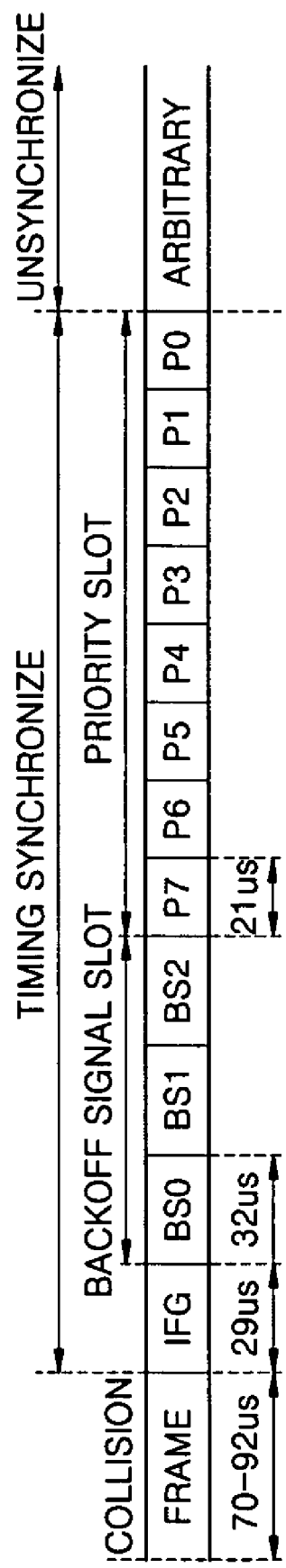
FIG. 4b is a timeslot after a collision among stations, the timeslot defined in the HomePNA standard version 2.0.
Figure 4C:
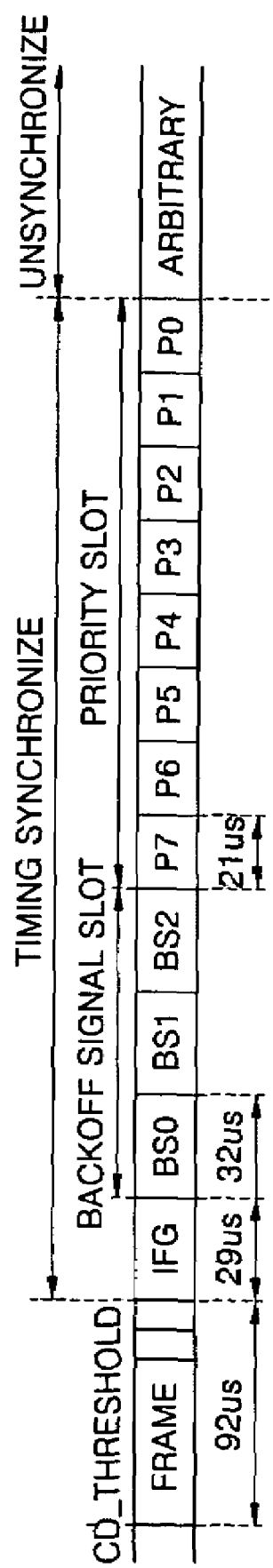
FIG. 4c is a timeslot after a collision among stations, the timeslot defined in the HomePNA standard version 2.1.

A tFG parameter shows a time length including a collision fragment frame length before a start time of the IFG when a collision occurs. If a tFG parameter value is 0, the IFG slot comes after the collision fragment frame, which is based on the HomePNA standard version 2.0. A default value of the tFG parameter is 92. This shows that a time length including a collision fragment frame length before a start time of the IFG is 92 μs, which is based on the HomePNA standard version 2.1 (refer to FIG. 4c). Considering a change of standard hereafter, the tFG parameter is designed so that a parameter setting (0-100 μs) is changed by an external source.

A tIFG parameter is a time length of the IFG. The HomePNA defines the IFG length as 29 μs. Under real operation conditions, an internal signal delay of a packet transmission system (a packet transceiver) can be compensated by reducing the IFG length using hardware. The tIFG parameter is also designed so that a parameter setting (0-128 μs) is changed by an external source.

A tSIG parameter is a time length of one back-off slot. The tSIG parameter is also designed so that a parameter setting (0-50 μs) is changed by an external source.

A tPRI parameter is a time length of one priority slot. The tPRI parameter is also designed so that a parameter setting (0-128 μs) is changed by an external source.

An nSIG parameter is the number of back-off slots. A default value of the nSIG parameter is 3 as is defined in HomePNA standards over version 2.0. QoS can be adjusted according to the number of back-off slots and the number of terminals simultaneously connected to the network. If too many back-off slots are set, it could waste time, and if too many terminals are simultaneously connected, a collision rate is higher.

If the number of back-off slots is adjusted by appropriately balancing the two numbers, the collision rate can be lowered and wasted time can also be reduced. Accordingly, the QoS can be improved. The nSIG parameter is also designed so that a parameter setting (0-7) is changed by an external source. When the number of stations simultaneously connected to a network increases due to development of a physical layer hereafter, a total QoS can be improved by adjusting the nSIG parameter.

A bitMBL parameter and a bitBL parameter show maximum values of the MBL register and the BL register, respectively. The HomePNA standards higher than version 2.0 define the MBL register and the BL register as 4-bit values each limited to 15. However, considering collisions in a HomePNA standard version 2.0 network and an increase in the number of simultaneously connected stations, the bitMBL parameter and the bitBL parameter are designed to be 8 bits each so that parameter settings (0-25) are changed by external sources.

A minFrameSize parameter is a minimum frame size that can be handled and a maxFrameSize parameter is a maximum frame size that can be handled. All frames not within the minFrameSize parameter and the maxFrameSize parameter are handled as errors. These parameters also can be changed according to a network environment.

A tVFrame parameter is a time length of a minimum frame determined as a valid frame not a collision fragment frame, by the carrier analyzer 601, that is, a minimum time length of a valid frame. A CD_min parameter is a minimum time length of a collision fragment frame. If the CS signal is activated between the tVFrame parameter and the CD_min parameter, the carrier analyzer 601 determines a received frame as a collision fragment frame. (A normal frame has a minimum length of 92.5 µs, and if a collision occurs, a collision frame, i.e., a collision fragment frame is between 32 µs and 92 µs.)

Figure 6Q:
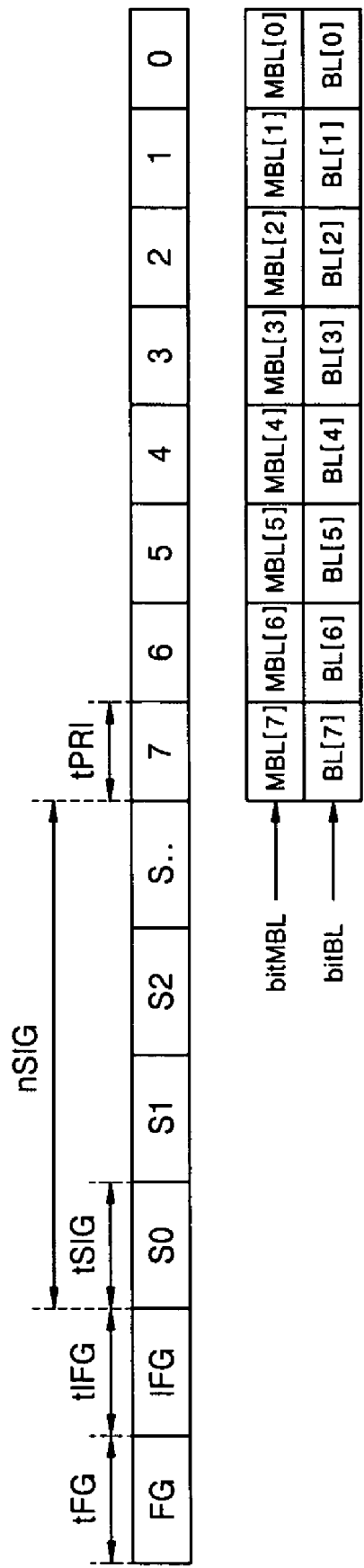
FIG. 6q is an embodiment of an updated configuration when parameters are re-set by the parameter setting unit.

FIG. 6q is an embodiment of an updated configuration when parameters are re-set by the parameter setting unit 605.

As shown in FIG. 6q, a time length of each time slot (these are different for every MAC and used for another MAC using parameters) and a length of each frame (lengths of a normal frame, a fragment frame, and a signal frame can be changed according to an environment) can be changed.

FIG. 7 is a timing diagram of the MAC 21.

When the Tx_PRI is 6, after the TxReady signal is activated, the transmission on generator 604 confirms that the BL value is 0 and enables a first TxDataOn signal at a timeslot of Tx_PRI=6 at time 701. If a collision occurs at time 702, a RndNum 1 is generated and the TxSigType signal and the TxDataOn signal are activated to transmit a signal frame at a back-off slot 1 (S1) at time 703.

Next, the BL register value of a slot (Tx_PRI=6) is calculated by the DFPQ algorithm in the collision resolution handler 603 and in input to the transmission on generator 604. Then, the transmission on generator 604 confirms that the BL value is 0 and enables a second TxDataOn signal at another timeslot of Tx_PRI=6 at time 704. If no collision occurs, transmission is finished.

A media access controller according to the present invention, which can set parameters and has a priority, and interface devices, can be installed in a packet transmission system such as a 10 Mbps HomePNA transceiver.

Also, the media access controller receives external parameters and can change the parameters to be suitable for a setting environment, thereby optimizing compatibility between standards.

Also, the media access controller improves the QoS by dealing with frames having transmission priorities, performing a collision resolution algorithm, and bounding a latency time after a collision by a predetermined time. Thus, the media access controller can be used well into the future While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A media access controller (MAC) of a packet transmission system (station), comprising:
   a carrier analyzer, which generates a timeslot using a carrier sense signal input from a modem of the station and outputs a type and a timeslot of a received frame;
   a collision resolution handler, which grants medium access by monitoring for collisions between stations and between itself and another station using a collision resolution algorithm;
   a random number generator, which generates a random number (RndNum) based on a source MAC address value when a collision between itself and another station occurs;
   a transmission on generator, which receives a transmission ready (TxReady) signal and a timeslot to be transmitted from a frame controller of the system and generates a data transmission on (TxDataOn) signal and a transmission frame type (TxSigType) signal, wherein if the transmission ready (TxReady) signal is received from the frame controller, the transmission on generator outputs the transmission frame type (TxSigType) signal and the data transmission on (TxDataOn) signal at a transmission data priority slot or an arbitrary slot, and if a collision occurrence signal (Col) is received from the frame controller, the transmission on generator outputs the transmission frame type (TxSigType) signal and the data transmission on (TxDataOn) signal at a back-off signal slot having the random number (RndNum); and
   a parameter setting unit, which adjusts operation parameters of the MAC to be suitable for a setting environment of the station so that the MAC is configurable to operate to be compatible with a plurality of network standards, said parameter setting unit forming an integral part of said MAC, and said operation parameters timeslot and frame information.

2. The MAC of claim 1, wherein the collision resolution handler calculates a maximum back-off level (MBL) value and a back-off level (BL) value using a Distributed Fair Priority Queuing (DFPQ) algorithm for every priority slot, and then, when the transmission ready (TxReady) signal is received from the frame controller, outputs the BL value which is equal to a transmission packet priority (Tx_PRI) value until the transmission is finished.

3. The MAC of claim 1, wherein the transmission on generator, if the transmission ready (TxReady) signal is received from the frame controller, outputs the transmission frame type (TxSigType) signal and the data transmission on (TxDataOn) signal at a transmission data priority slot or an arbitrary slot with reference to a back-off level (BL) value that is equal to a transmission packet priority (Tx_PRI) value, and, if a collision occurrence signal (Col) is received from the frame controller, outputs the transmission frame type (TxSigType) signal and the data transmission on (TxDataOn) signal at a back-off signal slot having a value equal to the random number (RndNum).

4. The MAC of claim 2, wherein the collision resolution handler bounds a latency time of a transmission frame by a predetermined time after a collision involving the station.

* * * * *